(12) United States Patent
Kulkarni et al.

(10) Patent No.: US 8,935,957 B2
(45) Date of Patent: Jan. 20, 2015

(54) METHODS OF DESIGNING A DRILLING FLUID HAVING SUSPENDABLE LOSS CIRCULATION MATERIAL

(71) Applicant: Halliburton Energy Services, Inc., Houston, TX (US)

(72) Inventors: Sandeep D. Kulkarni, Houston, TX (US); Kushabhau D. Teke, Pune, IN (US); Sharath Savari, Houston, TX (US); Dale E. Jamison, Houston, TX (US); Don Whitfill, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 195 days.

(21) Appl. No.: 13/798,560

(22) Filed: Mar. 13, 2013

(65) Prior Publication Data

US 2014/0262281 A1    Sep. 18, 2014

(51) Int. Cl.
*E21B 47/00* (2012.01)
*C09K 8/02* (2006.01)
*E21B 21/00* (2006.01)

(52) U.S. Cl.
CPC .................. *C09K 8/02* (2013.01); *E21B 21/003* (2013.01)
USPC ......................................................... 73/152.04

(58) Field of Classification Search
CPC .................................................... E21B 21/003
USPC ........................................ 73/152.04, 152.19
See application file for complete search history.

(56) References Cited

U.S. PATENT DOCUMENTS

| | | | |
|---|---|---|---|
| 2,793,996 A * | 5/1957 | Lummus | 507/138 |
| 3,206,256 A * | 9/1965 | Ray | 406/197 |
| 3,507,343 A * | 4/1970 | Gill et al. | 175/66 |
| 4,585,064 A | 4/1986 | Graham et al. | |
| 4,670,501 A | 6/1987 | Dymond et al. | |
| 4,982,793 A | 1/1991 | Holtmyer et al. | |
| 5,067,565 A | 11/1991 | Holtmyer et al. | |
| 5,122,549 A | 6/1992 | Holtmyer et al. | |
| 5,249,627 A | 10/1993 | Harms et al. | |
| 5,833,000 A | 11/1998 | Weaver et al. | |
| 5,839,510 A | 11/1998 | Weaver et al. | |
| 5,853,048 A | 12/1998 | Weaver et al. | |
| 5,905,061 A | 5/1999 | Patel | |
| 5,977,031 A | 11/1999 | Patel | |
| 6,287,639 B1 | 9/2001 | Schmidt et al. | |
| 6,311,773 B1 | 11/2001 | Todd et al. | |
| 6,439,309 B1 | 8/2002 | Matherly et al. | |
| 6,582,819 B2 | 6/2003 | McDaniel et al. | |
| 6,677,426 B2 | 1/2004 | Noro et al. | |
| 6,828,279 B2 | 12/2004 | Patel et al. | |
| 7,131,491 B2 | 11/2006 | Blauch et al. | |
| 7,153,575 B2 | 12/2006 | Anderson et al. | |
| 7,350,579 B2 | 4/2008 | Gatlin et al. | |
| 7,392,847 B2 | 7/2008 | Gatlin et al. | |
| 7,534,745 B2 | 5/2009 | Taylor et al. | |
| 7,645,723 B2 | 1/2010 | Kirsner et al. | |
| 7,673,686 B2 | 3/2010 | Nguyen et al. | |
| 7,696,131 B2 | 4/2010 | Oyler et al. | |
| 7,741,247 B2 | 6/2010 | Wang | |
| 7,757,766 B2 | 7/2010 | Lewis et al. | |
| 7,819,192 B2 | 10/2010 | Weaver et al. | |
| 7,825,074 B2 | 11/2010 | Schmidt et al. | |
| 7,956,017 B2 | 6/2011 | Gatlin et al. | |
| 8,003,579 B2 | 8/2011 | Akarsu et al. | |
| 8,076,271 B2 | 12/2011 | Blauch et al. | |
| 8,136,595 B2 | 3/2012 | Weaver et al. | |
| 8,151,633 B2 * | 4/2012 | Jamison et al. | 73/54.14 |
| 8,261,833 B2 | 9/2012 | Nguyen et al. | |
| 8,401,795 B2 * | 3/2013 | Kaageson-Loe et al. | 702/9 |
| 2007/0289781 A1 | 12/2007 | Rickman et al. | |
| 2008/0006405 A1 | 1/2008 | Rickman et al. | |
| 2008/0110621 A1 * | 5/2008 | Montgomery et al. | 166/280.1 |
| 2009/0008095 A1 | 1/2009 | Duncum et al. | |
| 2010/0139387 A1 * | 6/2010 | Jamison et al. | 73/152.25 |
| 2010/0160187 A1 | 6/2010 | Nguyen et al. | |
| 2010/0179281 A1 | 7/2010 | Nilsen | |

(Continued)

FOREIGN PATENT DOCUMENTS

EP    0404489 A2    12/1990
WO    2014164447 A1    10/2014

OTHER PUBLICATIONS

Pitt, "Vibratory Screening of Drilling Fluids," 1986, Doctoral Thesis of Loughborouh University of Technology.*
Clark et al., "A Mechanistic Model for Cuttings Transport," 1994, Society of Petroleum Engineers: SPE 28306, pp. 139-153.*
International Search Report and Written Opinion for PCT/US2014/022456 dated Jul. 7, 2014.

(Continued)

*Primary Examiner* — John Fitzgerald
(74) *Attorney, Agent, or Firm* — McDermott Will & Emery LLP; Holly Soehnge

(57) ABSTRACT

Methods including providing a wellbore in a subterranean formation having at least one pore opening; providing a proposed wellbore operation; providing a proposed treatment fluid; providing proposed FLCM particulates; calculating the suspendability of the proposed FLCM particulates in the proposed treatment fluid as determined by a yield gravity function based on properties of the proposed treatment fluid and properties of the proposed FLCM particulates or as determined by an experimental FLCM function; manipulating at least one of the properties of the proposed treatment fluid, the properties of the proposed FLCM particulates, or the proposed wellbore operation based on the yield gravity function or the experimental FLCM function so as to produce a FLCM-suspension treatment fluid; and introducing the FLCM-suspension treatment fluid into the wellbore in the subterranean formation so as to contact the at least one pore opening.

20 Claims, No Drawings

(56) References Cited

U.S. PATENT DOCUMENTS

| | | | |
|---|---|---|---|
| 2010/0258303 A1* | 10/2010 | Alberty | 166/244.1 |
| 2011/0039737 A1 | 2/2011 | Schmidt et al. | |
| 2011/0098394 A1 | 4/2011 | Schmeltzer et al. | |
| 2011/0278006 A1 | 11/2011 | Sanders et al. | |
| 2012/0152000 A1* | 6/2012 | Jamison et al. | 73/54.14 |
| 2012/0205102 A1 | 8/2012 | Lee et al. | |
| 2013/0146294 A1* | 6/2013 | DuPriest et al. | 166/308.1 |
| 2013/0332089 A1* | 12/2013 | Kulkarni et al. | 702/50 |

OTHER PUBLICATIONS

Andes, U.Ts., Equilibrium and motion of spheres in a viscoplastic liquid, Sov. Phys.-Dokl. (U.S.A.) 5, 723 (1961).

Article, Chhabra, Spheres in Visco-Plastic Liquids, pp. 129-130, 2007.

* cited by examiner

METHODS OF DESIGNING A DRILLING FLUID HAVING SUSPENDABLE LOSS CIRCULATION MATERIAL

BACKGROUND

The present invention relates to methods for producing subterranean formation treatment fluids with efficient fluid loss control material suspendability.

Hydrocarbon producing wells are typically formed by drilling a wellbore into a subterranean formation. A drilling fluid is circulated through a drill bit within the wellbore as the wellbore is being drilled. The drilling fluid is circulated back to the surface of the wellbore with drilling cuttings for removal from the wellbore. The drilling fluid maintains a specific, balanced hydrostatic pressure within the wellbore, permitting all or most of the drilling fluid to be circulated back to the surface. However, the hydrostatic pressure of the drilling fluid may be compromised if the drill bit encounters certain unfavorable subterranean zones, such as low pressure zones caused by natural fissures, fractures, vugs, or caverns, for example. Similarly, if the drill bit encounters high-pressure zones or crossflows, for example, an underground blowout may occur. The compromised hydrostatic pressure of the drilling fluid causes a reduction of drilling fluid volume returning to the surface, termed "lost circulation." The unfavorable subterranean zones contributing to lost circulation are termed "lost circulation zones." In addition to drilling fluids, other operational treatment fluids, such as fracturing fluid, may be lost to the subterranean formation due to fluid loss. The term "lost circulation" refers to loss of a drilling fluid, while the term "fluid loss" is a more general term that refers to the loss of any type of fluid into the formation. As a result, the service provided by the treatment fluid is often more difficult to achieve or suboptimal.

The consequences of lost circulation or fluid loss can be economically and environmentally devastating, ranging from minor volume loss of treatment fluids, to delayed drilling and production operations, to an underground well blowout. Therefore, the occurrence of fluid loss during hydrocarbon well operations typically requires immediate remedial steps. Remediation often involves introducing a composition into the wellbore to seal unfavorable subterranean zones and prevent leak off of treatment fluids within the formation to the unfavorable zones. Such compositions are generally referred to as "fluid loss control materials" or "FLCM."

In fluid loss control treatments, the specific gravity of the FLCMs may be high in relation to the treatment fluids in which they are suspended for transport and deposit at a lost circulation zone. Therefore, FLCMs may settle out of the treatment fluid such that they are insufficiently deposited at a lost circulation zone and unable to seal the zone and prevent or control lost circulation. For example, in some instances the FLCMs may so settle in the treatment fluid that they are lost to portions of the subterranean formation that do not require lost circulation controlling. In other instances, the FLCMs may so settle that there are not a sufficient number of FLCMs to control a lost circulation zone. Therefore, a subterranean formation treatment fluid that is able to substantially uniformly suspend FLCM particulates may be beneficial to one of ordinary skill in the art.

SUMMARY OF THE INVENTION

The present invention relates to methods for producing subterranean formation treatment fluids with efficient fluid loss control material suspendability.

In some embodiments, the present invention provides a method comprising: providing a wellbore in a subterranean formation having at least one pore opening; providing a proposed wellbore operation; providing a proposed treatment fluid; providing proposed FLCM particulates; calculating the suspendability of the proposed FLCM particulates in the proposed treatment fluid as determined by a yield gravity function based on properties of the proposed treatment fluid and properties of the proposed FLCM particulates or as determined by an experimental FLCM function, wherein the properties of the proposed treatment fluid and the properties of the proposed FLCM particulates are selected from the group consisting of rheological properties of the proposed treatment fluid; density of the proposed treatment fluid; size distribution of the proposed FLCM particulates; density of the proposed FLCM particulates; and any combination thereof; calculating the equivalent static density of the proposed treatment fluid containing the proposed FLCM particulates at at least one location in the wellbore; manipulating at least one of the properties of the proposed treatment fluid, the properties of the proposed FLCM particulates, or the proposed wellbore operation based on the yield gravity function or the experimental FLCM function and the equivalent static density so as to produce a FLCM-suspension treatment fluid; and introducing the FLCM-suspension treatment fluid into the wellbore in the subterranean formation so as to contact the at least one pore opening.

In other embodiments, the present invention provides for a method comprising: providing a wellbore in a subterranean formation having at least one pore opening; providing a proposed wellbore operation; providing a proposed treatment fluid; providing proposed FLCM particulates; calculating the suspendability of the proposed FLCM particulates in the proposed treatment fluid as determined by a yield gravity function based on properties of the proposed treatment fluid and properties of the proposed FLCM particulates or as determined by an experimental FLCM function, wherein the properties of the proposed treatment fluid and the properties of the proposed FLCM particulates are selected from the group consisting of rheological properties of the proposed treatment fluid; density of the proposed treatment fluid; size distribution of the proposed FLCM particulates; density of the proposed FLCM particulates; and any combination thereof; calculating the equivalent circulating density of the proposed treatment fluid containing the proposed FLCM particulates at at least one location in the wellbore; manipulating at least one of the properties of the proposed treatment fluid, the properties of the proposed FLCM particulates, or the proposed wellbore operation based on the yield gravity function or the experimental FLCM function and the equivalent circulating density so as to produce a FLCM-suspension treatment fluid; and introducing the FLCM-suspension treatment fluid into the wellbore in the subterranean formation so as to contact the at least one pore opening.

In still other embodiments, the present invention provides a method comprising: providing a wellbore in a subterranean formation having at least one pore opening; providing a proposed wellbore operation; providing a proposed treatment fluid; providing proposed FLCM particulates; calculating the suspendability of the proposed FLCM particulates in the proposed treatment fluid as determined by a yield gravity function based on properties of the proposed treatment fluid and properties of the proposed FLCM particulates or as determined by an experimental FLCM function, wherein the properties of the proposed treatment fluid and the properties of the proposed FLCM particulates are selected from the group consisting of rheological properties of the proposed treatment fluid; density of the proposed treatment fluid; size distribution of the proposed FLCM particulates; density of the proposed FLCM particulates; and any combination thereof; manipulating at least one of the properties of the proposed treatment fluid, the properties of the proposed FLCM particulates, or the proposed wellbore operation based on the yield gravity function or the experimental FLCM function so as to produce a FLCM-suspension treatment fluid; and introducing the FLCM-suspension treatment fluid into the wellbore in the subterranean formation so as to contact the at least one pore opening.

The features and advantages of the present invention will be readily apparent to those skilled in the art upon a reading of the description of the preferred embodiments that follows.

DETAILED DESCRIPTION

The present invention relates to methods for producing subterranean formation treatment fluids with efficient fluid loss control material suspendability.

Fluid loss may be a main cause of environmental and economical loss to the oil and gas industry, including a significant contribution to non-productive time (or "NPT") during hydrocarbon well operations. The methods of the present invention employ a means of determining whether a treatment fluid will be capable of adequately suspending FLCMs and manipulating the treatment fluid so as to ensure that it will adequately suspend FLCMs. While the methods of the present invention discuss specifically producing treatment fluids capable of spending fluid loss control materials, it will be recognized by one of ordinary skill in the art that the methods of the present invention may be used to produce fluids capable of suspending particulates for use in subterranean formation operations. For example, in some embodiments, the methods of the present invention may be used to produce treatment fluids capable of suspending proppant particulates for fracturing operations. In other embodiments, the methods of the present invention may be used to produce treatment fluids capable of suspending cutting particulates for drilling operations. In still other embodiments, the methods of the present invention may be used to produce treatment fluids capable of suspending particulates during hesitation squeeze operations. In still other embodiments, the methods of the present invention may be used to produce cementing treatment fluids capable of suspending FLCM particulates.

In some embodiments, the present invention provides a method comprising providing a wellbore in a subterranean formation having a plurality of pore openings and a proposed wellbore operation. As used herein, the term "pore opening" refers to any cavity within a subterranean formation including, for example, natural fissures, fractures, or vugs. As used herein, the term "wellbore operation" (also referred to herein as "subterranean formation operation" or "hydrocarbon well operation") may refer to any subterranean formation operation including, but not limited to, fracturing operations, hesitation squeeze operations, and the like. The method further comprises providing a proposed treatment fluid and proposed FLCM particulates. The suspendability of the proposed FLCM particulates in the proposed treatment fluid is calculated based on a yield gravity function using the properties of the proposed treatment fluid and the properties of the proposed FLCM particulates. The suspendability of the proposed FLCM particulates in the proposed treatment fluid may also be calculated using an experimental FLCM function. The properties of the proposed treatment fluid and the proposed FLCM particulates used to calculate the yield gravity function include, but are not limited to, the rheological properties of the proposed treatment fluid; the density of the proposed treatment fluid; the size distribution of the proposed FLCM particulates; the density of the proposed FLCM particulates; and any combination thereof. Based on the yield gravity function or the experimental FLCM function, any one or all of the properties of either the proposed treatment fluid and/or the properties of the proposed FLCM particulates are manipulated so as to produce a FLCM-suspension treatment fluid, which is then introduced into the wellbore in the subterranean formation so as to contract the pore opening and control lost circulation. Additionally, the proposed wellbore operation may be manipulated based on the yield gravity function or the experimental FLCM function. For example, the suspendability calculations may allow manipulation of the wellbore operation (e.g., by varying the time which a particular subset of the wellbore operation is performed) rather than manipulation of the proposed treatment fluid or the properties of the proposed FLCM particulates. As used herein, the term "FLCM-suspension treatment fluid" refers to a treatment fluid capable of substantially uniformly suspending specific FLCM particulates therein. That is, the FLCM suspension treatment fluid is designed such that it is compatible with particle FLCM particulates.

The treatment fluids of the present invention comprise a base fluid and, preferably, one or more components selected from the group consisting of a viscosifier; a filtration control agent; a shale stabilizer; a weighting agent; and a pH buffer. In some embodiments multiple types of viscosifier, filtration control agent, shale stabilizer, weighting agent, or pH buffer may be used.

Suitable base fluids for use in the treatment fluids of the present invention may include, but are not limited to, oil-based fluids; aqueous-based fluids; aqueous-miscible fluids; water-in-oil emulsions; oil-in-water emulsions; and any combination thereof. Suitable oil-based fluids may include, but are not limited to, an alkane; an olefin; an aromatic organic compound; a cyclic alkane; a paraffin; a diesel fluid; a mineral oil; a desulfurized hydrogenated kerosene; a crude oil; a petroleum distillate; a kerosene; a gas oil; a fuel oil; a low toxicity mineral oil; a polyolefin; a polydiorganosiloxane; a siloxane; an organosiloxane; an ester; and any combination thereof. Suitable aqueous-based fluids may include, but are not limited to, fresh water; saltwater (e.g., water containing one or more salts dissolved therein); brine (e.g., saturated salt water); seawater; and any combination thereof. Suitable aqueous-miscible fluids may include, but are not limited to, alcohols (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, magnesium chloride, potassium chloride, sodium bromide, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. No. 5,905,061 entitled "Invert Emulsion Fluids Suitable for Drilling" filed on May 23, 1997; U.S. Pat. No. 5,977,031 entitled "Ester Based Invert Emulsion Drilling Fluids and Muds Having Negative Alkalinity" filed on Aug. 8, 1998; U.S. Pat. No. 6,828,279 entitled "Biodegradable Surfactant for Invert Emulsion Drilling Fluid" filed on Aug. 10, 2001; U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004; U.S. Pat. No. 7,645,723 entitled "Method of Drilling Using Invert Emulsion Drilling Fluids" filed on Aug. 15, 2007; and U.S. Pat. No. 7,696,131 entitled "Diesel Oil-Based Invert Emulsion Drilling Fluids and Methods of Drilling Boreholes" filed on Jul. 5, 2007, each of which are incorporated herein by reference in their entirety. It should be noted that for water-in-oil and oil-in-water emulsions, any mixture of the above may be used including the water being and/or comprising an aqueous-miscible fluid.

The viscosifiers suitable for use in the present invention may comprise any substance (e.g., a polymeric material) capable of increasing the viscosity of the treatment fluid. In certain embodiments, the viscosifier may comprise one or more polymers that have at least two molecules that are capable of forming a crosslink in a crosslinking reaction in the presence of a crosslinking agent, and/or polymers that have at least two molecules that are so crosslinked (i.e., a crosslinked viscosifier). The viscosifiers may be naturally-occurring; synthetic; or a combination thereof. The viscosifiers of the present invention may also be cationic; anionic; or a combination thereof. Suitable viscosifiers for use in the treatment fluids of the present invention include, but are not limited to, polysaccharides; biopolymers; and/or derivatives thereof that contain one or more of these monosaccharide units: galactose; mannose; glucoside; glucose; xylose; arabinose; fructose; glucuronic acid; or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and combinations thereof.

Suitable synthetic polymers for use as a viscosifier in the treatment fluids of the present invention include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride; acrylamide; acrylamide- and methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethylaminopropylmethacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacryloylpropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivative thereof; and any combination thereof. In certain embodiments, the viscosifier may comprise an acrylamide/2-(methacryloyloxy)ethyltrimethylammonium methyl sulfate copolymer. In certain embodiments, the viscosifier may comprise an acrylamide/2-(rnethacryloyloxy)ethyltrimethylammonium chloride copolymer. In certain embodiments, the viscosifier may comprise a derivatized cellulose that comprises cellulose grafted with an allyl or a vinyl monomer, such as those disclosed in U.S. Pat. Nos. 4,982,793; 5,067,565; and 5,122,549, the entire disclosures of which are incorporated herein by reference. Additionally, polymers and copolymers that comprise one or more functional groups, such as, for example, hydroxyl; cis-hydroxyl; carboxylic acids; derivatives of carboxylic acids; sulfate; sulfonate; phosphate; phosphonate; amino; or amide groups may be used as viscosifiers for use in the treatment fluids of the present invention. An example of a commercially available viscosifier for use in the treatment fluids of the present invention is BARAZAN® D PLUS available from Halliburton Energy Services, Inc. in Houston, Tex.

The viscosifier may be present in the treatment fluids useful in the methods of the present invention in an amount sufficient to provide the desired viscosity. In some embodiments, the viscosifier(s) may be present in an amount in the range of from about 0.1 to about 40 pounds per 42 gallon barrel ("ppb") of the treatment fluid. In certain embodiments, the viscosifier(s) may be present in an amount in the range of from about 0.1 to about 15 ppb of the treatment fluid.

In those embodiments of the present invention where it is desirable to crosslink the viscosifier, the treatment fluid may comprise one or more crosslinking agents. Examples of suitable crosslinking agents include, but are not limited to, metal ions; borate ions; magnesium ions; zirconium IV ions; titanium IV ions; aluminum ions; antimony ions; chromium ions; iron ions; copper ions; magnesium ions; zinc ions; and any combination thereof. These ions may be provided by providing any compound that is capable of producing one or more of these ions, such as, for example, ferric chloride; boric acid; disodium octaborate tetrahydrate; sodium diborate; pentaborates; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and any combination thereof. The choice of a particular crosslinking agent will be governed by several considerations that will be recognized by one skilled in the art including, but not limited to, the type of viscosifier(s) included, the molecular weight of the viscosifier(s), the conditions in the subterranean formation, the safety handling requirements, the pH of the treatment fluid, and the like.

When included, suitable crosslinking agents may be present in the treatment fluids useful in the methods of the present invention in an amount sufficient to provide the desired degree of crosslinking between molecules of the viscosifier. In certain embodiments, the crosslinking agent may be present in the treatment fluids of the present invention in an amount in the range of from about 0.01 to about 10 ppb of the treatment fluid. In certain embodiments, the crosslinking agent may be present in the treatment fluids of the present invention in an amount in the range of from about 0.5 to about 5 ppb of the treatment fluid. One of ordinary skill in the art, with the benefit of this disclosure, will recognize the appropriate amount of crosslinking agent to include in a treatment fluid of the present invention based on, among other things, the temperature conditions of a particular application, the type of gelling agents used, the molecular weight of the gelling agents, the desired degree of viscosification, and/or the pH of the treatment fluid.

The filtration control agents suitable for use in the present invention may comprise any substance capable of managing filtration, including bridging, bonding, deflocculation, and viscosity. The filtration control agents of the present invention may also function to reduce filter cake permeability. Suitable filtration control agents, may include, but are not limited to, polyanionic cellulose; polyacrylate; modified lignite; powdered resin; modified starch; carboxymethylcellulose; and any combination thereof. Suitable commercially available filtration control agents include PAC™-R and DEXTRID®, available from Halliburton Energy Services, Inc. in Houston, Tex. In some embodiments, the filtration control agent(s) of the present invention may be present in an amount in the range of about 0.1 to about 20 ppb of the treatment fluid. In preferred embodiments, the filtration control agent(s) of the present invention may be present in an amount in the range of about 0.1 to about 5 ppb of the treatment fluid.

Suitable shale stabilizers for use in the treatment fluids of the present invention may include, but are not limited to, long chain alcohols; polyols; polyglycols; amine inhibitor; sodium or potassium silicate; partially hydrolyzed polyacrylamides; polyalkene glycols; anionic surfactants; salt solutions containing, for example, sodium chloride, potassium chloride, or ammonium chloride; cationic polymers and oligomers, for example, poly(dimethyldiallylammonium chloride), cationic poly(acrylamide) and cationic poly(dimethylaminoethylmethacrylate); and any combination thereof. Examples of commercially available shale stabilizers are CLAY SYNC™, CLAYSEAL® PLUS, PERFORMATROL®, GEM™ GP, GEM™ CP, BORE-HIB®, BARO-TROLL® PLUS, EZ-MUD®, EZ-MUD® GOLD, and BARASIL™-S, available from Halliburton Energy Services, Inc, in Houston, Tex. In some embodiments, the shale stabilizer(s) of the present invention may be present in an amount in the range of about 0.1 to about 30 ppb of the treatment fluid. In preferred embodiments, the shale stabilizer(s) of the present invention may be present in an amount in the range of about 1 to about 15 ppb of the treatment fluid.

The weighting agents for use in the treatment fluids of the present invention may be any material capable of increasing the density of the treatment fluid. The weighting agent may additionally aid in controlling formation pressures and stabilizing the wellbore. Suitable weighting agents for use in the treatment fluids of the present invention may include, but are not limited to, barite; hematite; ilmentite; manganese tetraoxide; galena; calcium carbonate; iron oxide; galena; magnetite; siderite; celesite; and any combination thereof. Examples of a commercially available weighting agent is BAROID®, available from Halliburton Energy Services, Inc, in Houston, Tex. In some embodiments, the weighting agent(s) of the present invention may be present in an amount in the range of about 1 to about 1,000 ppb of the treatment fluid. In preferred embodiments, the weighting agent(s) of the present invention may be present in an amount in the range of about 10 to about 700 ppb of the treatment fluid.

Suitable pH buffers for use in the treatment fluids of the present invention may be any pH buffer capable of controlling the pH of the treatment fluid (e.g., increasing or decreasing the pH). The pH buffers may be included in the treatment fluids of the present invention so as to, for example, enhance the stability of the treatment fluid. Suitable pH buffers may include, but are not limited to, sodium carbonate; potassium carbonate; sodium bicarbonate; potassium bicarbonate; sodium diacetate; potassium diacetate; ammonium diacetate; sodium phosphate; potassium phosphate; sodium hydrogen phosphate; potassium hydrogen phosphate; sodium dihydrogen phosphate; potassium dihydrogen phosphate; sodium borate; magnesium oxide; sulfamic acid; sodium hydroxide; potassium hydroxide; citric acid; tartaric acid; and any combination thereof. The pH buffer may be present in the treatment fluids of the present invention in an amount sufficient to maintain the pH of the treatment fluid at a desired level. In some embodiments, the pH buffer is present in an amount in the range of about 0.01 to about 10 ppb of the treatment fluid. In some embodiments, the pH buffer is present in an amount in the range of about 0.1 to about 2 ppb of the treatment fluid.

The FLCM particulates of the present invention may be of any material known in the art suitable for use as an FLCM in a hydrocarbon well operation. Suitable FLCM particulates for use in the methods of the present invention include, but are not limited to, ground coal; petroleum coke; sized calcium carbonate; asphaltene; perlite; cellophane; cellulose; ground tire material; ground oyster shell; vitried shale; a plastic material; paper fiber; wood; cement; hardened foamed cement; glass; foamed glass; sand; bauxite; a ceramic material; a polymer material (such as ethylene vinyl acetate); a polytetrafluoroethylene material; a nut shell; a seed shell piece; a fruit pit piece; clay; silica; alumina; fumed carbon; carbon black; graphite; mica; titanium oxide; meta-silicate; calcium silicate; kaolin; talc; zirconia; boron; fly ash; a hollow glass microsphere; any composite particle thereof; and any combination thereof. Examples of suitable commercially available FLCM particulate include, but are not limited to, WALL-NUT®, BARACARB®, STEELSEAL®, N-SQUEEZE™, N-SEAL™, N-PLEX™, HYDRO-PLUG®, DUROSQUEEZE™ H, BAROFIBRE®, BAROFIBRE® O, available from Halliburton Energy Services, Inc, in Houston, Tex.

The composite particles for use as FLCM particulates may be formed by the combination of one or more types of FLCM particulate materials using a consolidating agent. Suitable consolidating agents may include, but are not limited to, non-aqueous tackifying agents; aqueous tackifying agents; emulsified tackifying agents; silyl-modified polyamide compounds; resins; crosslinkable aqueous polymer compositions; polymerizable organic monomer compositions; consolidating agent emulsions; zeta-potential modifying aggregating compositions; silicon-based resins; and binders. Combinations and/or derivatives of these also may be suitable. Nonlimiting examples of suitable non-aqueous tackifying agents may be found in U.S. Pat. Nos. 7,392,847; 7,350,579; 5,853,048; 5,839,510; and 5,833,000, the entire disclosures of which are herein incorporated by reference. Nonlimiting examples of suitable aqueous tackifying agents may be found in U.S. Pat. Nos. 8,076,271; 7,131,491; 5,249,627; and 4,670,501, the entire disclosures of which are herein incorporated by reference. Nonlimiting examples of suitable crosslinkable aqueous polymer compositions may be found in U.S. Patent Application Publication No. 2010/0160187 (abandoned) and U.S. Pat. No. 8,136,595, the entire disclosures of which are herein incorporated by reference. Nonlimiting examples of suitable silyl-modified polyamide compounds may be found in U.S. Pat. No. 6,439,309, the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication No. 2008/0006405 (abandoned) and U.S. Pat. No. 8,261,833, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable consolidating agent emulsions may be found in U.S. Patent Application Publication No. 2007/0289781 (pending) the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in U.S. Patent Application Publication Nos. 2011/0098394 (pending) and 2010/0179281 (pending) and U.S. Pat. Nos. 8,168,739 and 8,261,833, the entire disclosures of which are herein incorporated by reference. Nonlimiting examples of suitable binders may be found in U.S. Pat. Nos. 8,003,579; 7,825,074; and 6,287,639, as well as U.S. Patent Application Publication No, 2011/0039737 (pending), the entire disclosures of which are herein incorporated by reference. It is within the ability of one skilled in the art, with the benefit of this disclosure, to determine the type and amount of consolidating agent to include in the methods of the present invention to achieve the desired results.

The FLCM particulates of the present invention may be of any size or shape combination compatible with a hydrocarbon well operation. The FLCM particulates of the present invention may be substantially spherical or substantially non-spherical, and may also be hollow. Suitable lost circulation components for use in the present invention may be, for example, spherical-shaped; cubic-shaped; rod-shaped; cone-shaped; ellipse-shaped; cylinder-shaped; polygon-shaped; pyramid-shaped; torus-shaped; cross-shaped; lattice-shaped; star-shaped; or any other shape. The FLCM particulates of the present invention may be of any size required for use in the particular subterranean treatment; any size will be suitable for use in the methods of the present invention. In some embodiments, the FLCM particulates of the present invention may have a size in the range from about 2 to about 400 mesh, U.S. Sieve Series. In preferred embodiments, the FLCM particulates of the present invention may have a size in the range from about 8 to about 400 mesh, U.S. Sieve Series. In other embodiments, the FLCM particulates of the present invention may have a size in the range from about 8 to about 120 mesh, U.S. Sieve Series. The FLCM particulates of the present invention may range in sphericity from about 0 to about 1. In preferred embodiments, the sphericity of the FLCM particulates may be in the range from about 0.1 to about 1. FLCM particulates that are substantially non-spherical (e.g., having sphericity values at least below 1) may have an aspect ratio in the range of about 1 to about 1000.

The suspendability of FLCM particulates in the treatment fluid of the present invention may be calculated based on a yield gravity function using the properties of a proposed treatment fluid and the properties of proposed FLCM particulates. The properties of the proposed treatment fluid and the proposed FLCM particulates used to calculate the yield gravity function include, but are not limited to, the rheological properties of the proposed treatment fluid; the density of the proposed treatment fluid; the size distribution of the proposed FLCM particulates; the density of the proposed FLCM particulates; and any combination thereof.

The yield gravity function of the present invention is used to determine the suspendability of at least one proposed FLCM particulate in a proposed treatment fluid formulation of the present invention. That is, the yield gravity function explains whether or whether not a FLCM particulate would or would not settle out of a treatment fluid. Typically, the buoyant weight of a FLCM particulate may be supported by the vertical component of the force due to the yield stress acting upon the FLCM particulate.

Generally, the yield gravity function of the present invention may be calculated using the formula:

$$Y_G = \frac{\tau_0}{g*d*(\rho_p - \rho)} \quad (1)$$

where $Y_G$ is the yield gravity function of the present invention; $\tau_0$ is the rheological properties of the proposed treatment fluid; g is acceleration due to gravity; d is the size of the individual proposed FLCM particulates or the average size based on the size distribution of the proposed FLCM particulates; $\rho_p$ is density of the proposed FLCM particulates; and $\rho$ is density of the proposed treatment fluid. As used herein, "size distribution" refers to the average effective diameter of the proposed FLCM particulates for use in the methods of the present invention.

The rheological properties of the proposed treatment fluid of the present invention, $\tau_0$, may be based on any one, or any combination of, shear stress at selected shear rate(s), the low shear yield point ("LSYP"), the yield stress estimated from a visco-plastic model (e.g., the Bingham plastic model or the Herschel-Bulkley yield stress), or the gel strength (e.g., the 10 sec gel strength, 10 min gel strength, 30 min gel strength, or a gel strength at any other desired time interval).

In some embodiments, the concentration of the proposed FLCM particulates are taken into account when calculating the yield gravity function:

$$Y_G = \frac{\tau_0 * f[\phi]}{g*d*(\rho_p - \rho)} \quad (2)$$

where $f[\phi]$ is the function of the concentration of the proposed FLCM particulates. Various forms of the function, $f[\phi]$, may include, but are not limited to, a power function; an exponential function; a linear function; and any combination thereof. It may be desirable to take into account the concentration of the proposed FLCM particulates when a particularly large concentration of FLCM particulates is required to control a particularly large lost circulation zone, for example. Typically, it may not be necessary to take into account the concentration of the proposed FLCM particulates of the present invention unless the concentration is greater than about 5% by volume of the treatment fluid.

In other embodiments, the temperature and pressure of the wellbore in the subterranean formation may be taken into account to calculate the yield gravity function of the present invention. This may be particularly relevant because the density of the proposed treatment fluid may increase as pressure increases, but decrease as temperature increases. Notably, however, when the lost circulation zone to be treated in the wellbore in the subterranean formation is particularly deep, the temperature effects tend to dominate the pressure effects. Also, temperature and pressure may influence the rheological properties, $\tau_0$, of the proposed treatment fluid. The yield gravity function of the present invention may take into effect the temperature and pressure of the wellbore in the subterranean formation using the formula:

$$Y_G = \frac{\tau_0(P, T)}{g * d * (\rho_p - \rho(P, T))} \quad (3)$$

where P,T is the pressure and temperature of the wellbore in the subterranean formation.

In other embodiments, when the base fluid used in the proposed treatment fluid of the present invention is an oil (e.g., oil-based fluid; water-in-oil emulsion; or oil-in-water emulsion), the oil-to-water ratio may be taken into account to calculate the yield gravity function. In these embodiments, the yield gravity function may be calculated based on the formula:

$$Y_G = \frac{\tau_0 * f[o/w]}{g * d * (\rho_p - \rho)} \quad (4)$$

where $f[o/w]$ is the function of the oil-to-water ratio of the proposed treatment fluid. Various forms of the function, $f[o/w]$, may include, but are not limited to, a power function; an exponential function; a linear function; and any combination thereof.

In some embodiments, the pressure and temperature of the subterranean formation may be taken into account, as well as the oil-to-water ratio when the base fluid used in the proposed treatment fluid of the present invention is an oil (e.g., oil-based fluid; water-in-oil emulsion; or oil-in-water emulsion), using the formula:

$$Y_G = \frac{\tau_0(P, T) * f[o/w]}{g * d * (\rho_p - \rho(P, T))} \quad (5)$$

Various forms of the function, $f[o/w]$, may include, but are not limited to, a power function; an exponential function; a linear function; and any combination thereof.

In some embodiments, the function of the various properties discussed previously including, the concentration of the proposed FLCM particulates, the size or average size of the FLCM particulates, the oil-to-water ratio of the proposed treatment fluid, and the dependence of properties on the pressure and temperature of the wellbore in the subterranean formation, for example, may be taken into account. In those embodiments where all of these properties are taken into account, the yield gravity function may be calculated based on the following formula, from which equations (1) through (5) above may be considered subsets:

$$Y_G = \frac{f[\tau_0(P, T)] * f[o/w] * f[\phi]}{g * f[d] * f[(\rho_p - \rho(P, T))]} \quad (6)$$

Various forms of the functions, $f[\tau_0(P,T)]$, $f[o/w]$, $f[\phi]$, $f[d]$, $f[(\rho_p-\rho(P,T))]$ may include, but are not limited to, a power function; an exponential function; a linear function; and any combination thereof.

Any or all of the various properties of the proposed treatment fluid and proposed FLCM particulates of the present invention (i.e., the rheological properties of the proposed treatment fluid; the density of the proposed treatment fluid; the oil-to-water ratio of the proposed treatment fluid; the size distribution of the proposed FLCM particulates; the concentration of the proposed FLCM particulates; and the density of the proposed particulates) may be manipulated in order to produce the FLCM-suspension treatment fluid of the present invention. Additionally, the proposed wellbore operation may be manipulated. In some embodiments, the steps of calculating the suspendability of the proposed FLCM particulates in the proposed treatment fluid as determined by the yield gravity function and manipulating at least one of the properties of the proposed treatment fluid, the properties of the proposed FLCM particulates, or the proposed wellbore operation based on the yield gravity function are repeated at least once so as to produce the FLCM-suspension carrier fluid.

The calculated yield gravity function value of the present invention may inform the suspendability of the proposed FLCM particulates in the proposed treatment fluids of the present invention. For example, based on the examples of the methods of the present invention described herein, a yield gravity function value of less than about 0.5 indicates that the proposed FLCM particulates will not be suspendable in the proposed treatment fluid. On the other hand, a yield gravity function value of less than about 1 but greater than about 0.5 indicates that the proposed FLCM particulates may be suspendable, but only weakly so, in the proposed treatment fluids of the present invention. Lastly, a yield gravity function value of equal to or greater than about 1 indicates that the proposed FLCM particulates will exhibit suspendability in the proposed treatment fluids of the present invention. The methods of the present invention of manipulating the properties of the proposed treatment fluids or the proposed FLCM particulates is based on these values so as to achieve a yield gravity function value of equal to or greater than about 1, or at least a yield gravity function value of greater than about 0.5. These specific values are applicable to the examples in the present invention and are dependent upon, among other things, the conditions of the proposed treatment fluids, the subterranean formation, the method chosen for modeling the rheology of the proposed treatment fluids, and the duration of suspendability required. Thus, the yield gravity function value is itself relative, but will exhibit similar suspendability relative yield gravity function values.

In some embodiments, the present invention provides a method of calculating the suspendability of proposed FLCM particulates in a proposed treatment fluid based on the yield. Then either the equivalent static density or the equivalent circulating density of the proposed treatment fluid used to treat a specific subterranean is calculated. Thereafter, the proposed FLCM particulates and/or the proposed treatment fluid is manipulated so as to achieve a yield gravity function value of greater than about 1, or at least a yield gravity function value of greater than about 0.5.

As used herein, the term "equivalent static density" refers to the hydrostatic pressure exerted by the proposed treatment fluid of the present invention at any particular depth in a subterranean formation. The equivalent static density is a function of the density of the proposed fluid and the height of the fluid column. As used herein, the term "equivalent circulating density" refers to the sum of the hydrostatic pressure of the head of the proposed treatment fluid column within a subterranean formation and the pressure loss due to friction in the subterranean formation. The pressure loss due to friction within the subterranean formation refers to the loss in pressure during the flow of the proposed treatment fluid in the subterranean formation due to contact between the fluid and the subterranean formation. The equivalent static density and equivalent circulating density are known parameters that may be determined by any method known to those of ordinary skill in the art. In some embodiments, the equivalent static density and/or equivalent circulating density are substantially equal to or greater than the pore pressure of the wellbore in the subterranean formation and substantially equal to or less than the fracture gradient of the wellbore in the subterranean formation. As used herein, the term "pore pressure" refers to the pressure of subsurface formation fluids within a subterranean formation. As used herein, the term "fracture gradient" refers to the minimum downhole pressure required to induce fractures in a subterranean formation.

In some embodiments, the methods of the present invention provide for calculating the equivalent static density or the equivalent circulating density by taking into account the temperature and pressure conditions of the subterranean formation. The temperature and pressure conditions of the subterranean formation may be particularly important factors to consider when, for example, calculating the equivalent static density or the equivalent circulating density of a particularly deep, hot wellbore in a subterranean formation. Failing to include these conditions may cause the equivalent static density or the equivalent circulating density calculations to be in error, often substantially in error.

In some embodiments of the present invention, the properties of the proposed treatment fluid, the properties of the proposed FLCM particulates, and/or the proposed wellbore operation are manipulated not only based on the yield gravity function value or the experimental function, but also so as to achieve an equivalent static density or an equivalent circulating density within the acceptable range to maintain wellbore stability during drilling operations. The acceptable range of equivalent static density and equivalent circulating density are dependent upon the behavior of the proposed treatment fluid containing the proposed FLCM particulates and the geometry and conditions of the particular subterranean formation to be treated, such as, for example, the fracture gradient value, pore gradient value, and the like.

To facilitate a better understanding of the present invention, the following examples of preferred or representative embodiments are given. In no way should the following examples be read to limit, or to define, the scope of the invention.

EXAMPLES

Example 1

Four proposed treatment fluids were prepared based on the methods of the present invention, as described in Table 1.

TABLE 1

|  | Fluid A | Fluid B | Fluid C | Fluid D |
| --- | --- | --- | --- | --- |
| BARAZAN ®D PLUS (ppb) | 1 | 1.2 | 1.5 | 1.5 |
| PAC ™-R (ppb) | 1 | 1.25 | 1.25 | 1.25 |
| DEXTRID ® (ppb) | 2 | 2 | 2 | 2 |
| CLAYSEAL ® PLUS (ppb) | 3.5 | 3.5 | 3.5 | 3.5 |
| PERFORMATROL ® (ppb) | 7.5 | 7.5 | 7.5 | 7.5 |
| BARABUF ® (ppb) | 0.3 | 0.25 | 0.25 | 0.25 |
| BAROID ® | As required (mud weight = 9 lbs per gallon) | As required (mud weight = 9 lbs per gallon) | As required (mud weight = 9 lbs per gallon) | As required (mud weight = 10 lbs per gallon) |
| NaCl Brine | To balance | To balance | To balance | To balance |

The rheological properties, $\tau_0$, of the four proposed treatment fluids for use in calculating the yield gravity function of the present invention were determined using a FANN-35 rheometer (an oil-field viscometer) to determine the LSYP and the 10 min gel strength of the proposed treatment fluid after hot-rolling the fluids at 150° F. for 16 hours. The LSYP was calculated based on the formula [2*(3 RPM rheometer value)−(6 RPM rheometer value). The 10 min gel strength was measured after leaving the proposed treatment fluids under static conditions for 10 min and then obtaining the maximum value shown on the rheometer at 3 RPM. The density of the proposed treatment fluids was measured on a mud balance. The LSYP and 10 min gel strength are shown in Table 2,

TABLE 2

|  | Fluid A ($\tau_0$) | Fluid B ($\tau_0$) | Fluid C ($\tau_0$) | Fluid D ($\tau_0$) |
| --- | --- | --- | --- | --- |
| LSYP (lb/100 ft$^2$) | 3 | 4 | 6 | 8 |
| 10 min gel strength (lb/100 ft$^2$) | 5 | 9 | 13 | 14 |

Suspendability tests were performed using the four proposed treatment fluids and the proposed FLCM particulates sizes. The proposed FLCM particulates were formed by sieving WALL-NUT® particulates. The density of the proposed FLCM particulates was evaluated using a version 2.4 helium ultrapycnometer from Quantachrome Corporation. The proposed FLCM particulates are listed in Table 3.

TABLE 3

|  | U.S. Sieve Series | FLCM size (μm) | Density (g/cc) |
|---|---|---|---|
| FLCM 1 | −30 mesh +35 mesh | 500-600 | 1.43 |
| FLCM 2 | −18 mesh +20 mesh | 850-1000 |  |
| FLCM 3 | −14 mesh +16 mesh | 1180-1400 |  |

The proposed FLCM particulates were included in the proposed treatment fluids in a concentration of about 4.5% by volume, mixed thoroughly with a spatula and poured into a glass liner in a stainless steel aging cell preheated to 150° F. The stainless steel aging cell was pressurized to 100 psi with nitrogen gas. Then, the proposed treatment fluids containing the proposed FLCM particulates were placed in a static oven ("static aging") at 150° F. for 4 hours and then cooled in a 68° F. water bath for 10 minutes. The suspendability of the proposed FLCM particulates in the proposed treatment fluids was investigated by separating the mixture into two equal samples representing the top half of the fluid in the cell and the bottom half of the fluid in the cell (resulting in FLCM $1^{Top}$, FLCM $1^{Bot}$, FLCM $2^{Top}$, FLCM $2^{Bot}$, FLCM $3^{Top}$, FLCM $3^{Bot}$). Each sample was then filtered through 50 mesh, U.S. Sieve Series, followed by a water wash of the FLCM particulates collected by the mesh with water to remove any residual fluid. The separated FLCM particulates were dried at 105° C., cooled to room temperature, and weighed.

By way of example, FLCM 1, FLCM 2, and FLCM 3 were tested for their suspendability in Fluid B. After static aging, the suspendability of each proposed FLCM particulate size was evaluated by observation. The large sized proposed FLCM particulates, FLCM 3 had almost completely settled out of Fluid B, whereas the medium sized proposed FLCM particulates, FLCM 2 showed at least some suspendability and the small sized proposed FLCM particulates, FLCM 1 stayed uniformly suspending in Fluid B. Therefore, the suspendability of FLCM particulates in a treatment fluid decreases with increasing FLCM particulate sizes, qualitatively in agreement with the yield gravity function of the present invention.

In some embodiments, the suspendability of the FLCM particulates of the present invention may be calculated based on an experimental FLCM function. The experimental FLCM functions of the present invention may include, for example, a top-distribution FLCM function or a bottom-distribution FLCM function. Additionally, the suspendability of the FLCM particulates of the present invention may be calculated at any finite section(s) of the fluid after the fluid is aged for a finite period of time. Other experimental FLCM functions may be used in the present invention, as will be appreciated by one or ordinary skill in the art, with the benefit of this disclosure. The top-distribution FLCM function, or % $FLCM^{Top}$, determines the percentage of proposed FLCM particulates in the top half of a treatment fluid after the fluid is aged for a finite period of time, based on the following formula:

$$\% FLCM^{Top} = \frac{FLCM^{Top}}{FLCM^{Top} + FLCM^{Bot}} * 100 \quad (7)$$

The bottom-distribution FLCM function, % $FLCM^{Bot}$, determines the percentage of proposed FLCM particulates in the bottom half of a treatment fluid after the fluid is aged for a finite period of time, based on the following formula:

$$\% FLCM^{Bot} = \frac{FLCM^{Bot}}{FLCM^{Bot} + FLCM^{Top}} * 100 \quad (8)$$

In some embodiments, the steps of calculating the suspendability of the proposed FLCM particulates in the proposed treatment fluid as determined by the experimental FLCM function (e.g., the top-distribution FLCM function or the bottom-distribution function) and manipulating at least one of the properties of the proposed treatment fluid, the properties of the proposed FLCM particulates, or the proposed wellbore operation based on the experimental FLCM function are repeated at least once so as to produce the FLCM-suspension carrier fluid.

In this example, the experimental FLCM function used was the top-distribution FLCM function, or % $FLCM^{Top}$, and was determined for each treatment fluid (FLCM $1^{Top}$, FLCM $2^{Top}$, and FLCM $3^{Top}$) after static aging. Where no settling of FLCM particulates occurs in a proposed treatment fluid, % $FLCM^{Top} \approx 50\%$. Where settling of all or most of the FLCM particulates occurs in a proposed treatment fluid, % $FLCM^{Top} \approx 0\%$. When only partial setting of FLCM particulates occurs in a proposed treatment fluid, $0\% < \% FLCM^{Top} < 50\%$. The % $FLCM^{Top}$ for FLCM 1, FLCM 2, and FLCM 3 in Fluid B was determined and compared to the yield gravity function value of the present invention. The results are shown in Table 4 and demonstrate that good suspendability, as defined herein as a yield gravity function value of equal to or greater than about 1 corresponds to a $FLCM^{Top}$ in the range of about 40% to about 50%.

TABLE 4

|  | % $FLCM^{Top}$ | Yield Gravity Function Value |
|---|---|---|
| FLCM 1 | 1.3% | 0.46 |
| FLCM 2 | 17.2% | 0.64 |
| FLCM 3 | 40.3% | 1.1 |

Example 2

In this example, the effect of the rheological properties of a proposed carrier fluid on the suspendability of FLCM particulates was evaluated. Using the compositions and methods of Example 1, FLCM 2 particulates were evaluated in both Fluid B and Fluid C. Fluid B and Fluid C have the same densities but different rheological properties (i.e., Fluid B has a LSYP of 4 and Fluid C has a LSYP of 6). Based on visual observation after static aging, the FLCM 2 particulates showed significant settling in Fluid B, but not in Fluid C, indicating that suspendability of a proposed FLCM particulate in a proposed treatment fluid increases with higher rheological conditions values, qualitatively in agreement with the yield gravity function of the present invention. The % $FLCM^{Top}$ for the FLCM 2 particulates in Fluid B and Fluid C were determined and compared to the yield gravity function value of the present invention. The results as shown in Table 5 further confirm that good suspendability, as defined herein as a yield gravity function value of about equal to or greater than about 1 corresponds to a $FLCM^{Top}$ in the range of about 40% to about 50%.

TABLE 5

| | % FLCM$^{Top}$ | Yield Gravity Function Value |
|---|---|---|
| Fluid B + FLCM 2 | 17.2% | 0.64 |
| Fluid C + FLCM 3 | 45.6% | 0.98 |

Example 3

Using the compositions and methods of Example 1, the yield gravity function and % FLCM$^{Top}$ for each of Fluid A, Fluid B, Fluid C, and Fluid D were evaluated in combination with FLCM 1, FLCM 2, and FLCM 3. The results confirm the correlations established in Example 1 and Example 2, that suspendability increases with decreasing FLCM particulate size and increasing rheological properties values and that a yield gravity function value of equal to or greater than about 1 corresponds to a FLCM$^{Top}$ in the range of about 40% to about 50%, indicating good suspendability. The yield gravity function results are shown in Table 6 and the % FLCM$^{Top}$ values are shown in Table 7.

TABLE 6

| | Yield Gravity Function Value | | |
|---|---|---|---|
| | FLCM 1 | FLCM 2 | FLCM 3 |
| Fluid A | 0.81 | 0.48 | 0.34 |
| Fluid B | 1.1 | 0.64 | 0.45 |
| Fluid C | 1.6 | 0.98 | 0.68 |
| Fluid D | 2.9 | 1.7 | 1.2 |

TABLE 7

| | % FLCM$^{Top}$ | | |
|---|---|---|---|
| | FLCM 1 | FLCM 2 | FLCM 3 |
| Fluid A | 4% | 0% | 0% |
| Fluid B | 40.3% | 17.2% | 1.3% |
| Fluid C | 48% | 45.6% | 31.3% |
| Fluid D | 51% | 50.8% | 47.4% |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may, vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a wellbore in a subterranean formation having at least one pore opening;
providing a proposed wellbore operation;
providing a proposed treatment fluid;
providing proposed FLCM particulates;
calculating the suspendability of the proposed FLCM particulates in the proposed treatment fluid as determined by a yield gravity function based on properties of the proposed treatment fluid and properties of the proposed FLCM particulates or as determined by an experimental FLCM function,
wherein the properties of the proposed treatment fluid and the properties of the proposed FLCM particulates are selected from the group consisting of rheological properties of the proposed treatment fluid; density of the proposed treatment fluid; size distribution of the proposed FLCM particulates; density of the proposed FLCM particulates; and any combination thereof;
calculating the equivalent static density of the proposed treatment fluid containing the proposed FLCM particulates at at least one location in the wellbore;
manipulating at least one of the properties of the proposed treatment fluid, the properties of the proposed FLCM particulates, or the proposed wellbore operation based on the yield gravity function or the experimental FLCM function and the equivalent static density so as to produce a FLCM-suspension treatment fluid; and
introducing the FLCM-suspension treatment fluid into the wellbore in the subterranean formation so as to contact the at least one pore opening.

2. The method of claim 1, wherein temperature and pressure conditions of the wellbore in the subterranean formation are taken into account to calculate the yield gravity function.

3. The method of claim 1, wherein temperature and pressure conditions of the wellbore in the subterranean formation are taken into account to calculate the equivalent static density.

4. The method of claim 1, wherein the properties used to calculate the yield gravity function is a concentration of the proposed FLCM particulates.

5. The method of claim 1, wherein the properties used to calculate the yield gravity function are an oil-to-water ratio of the proposed treatment fluid when the proposed treatment fluid is an oil-based fluid; a water-in-oil emulsion; or a oil-in-water emulsion.

6. The method of claim 1, wherein the equivalent static density is substantially equal to or greater than a pore pressure of the wellbore in the subterranean formation and substantially equal to or less than a fracture gradient of the wellbore in the subterranean formation.

7. The method of claim 1, wherein the steps of calculating the suspendability of the proposed FLCM particulates in the proposed treatment fluid as determined by the yield gravity function or the experimental FLCM function, calculating the equivalent static density of the proposed treatment fluid containing the proposed FLCM particulates at at least one location in the wellbore, and manipulating at least one of the properties of the proposed treatment fluid, the properties of the proposed FLCM particulates, or the proposed wellbore operation based on the yield gravity function or the experimental FLCM function and the equivalent static density are repeated at least once so as to produce the FLCM-suspension carrier fluid.

8. A method comprising:
providing a wellbore in a subterranean formation having at least one pore opening;
providing a proposed wellbore operation;
providing a proposed treatment fluid;
providing proposed FLCM particulates;
calculating the suspendability of the proposed FLCM particulates in the proposed treatment fluid as determined by a yield gravity function based on properties of the proposed treatment fluid and properties of the proposed FLCM particulates or as determined by an experimental FLCM function,
wherein the properties of the proposed treatment fluid and the properties of the proposed FLCM particulates are selected from the group consisting of rheological properties of the proposed treatment fluid; density of the proposed treatment fluid; size distribution of the proposed FLCM particulates; density of the proposed FLCM particulates; and any combination thereof;
calculating the equivalent circulating density of the proposed treatment fluid containing the proposed FLCM particulates at at least one location in the wellbore;
manipulating at least one of the properties of the proposed treatment fluid, the properties of the proposed FLCM particulates, or the proposed wellbore operation based on the yield gravity function or the experimental FLCM function and the equivalent circulating density so as to produce a FLCM-suspension treatment fluid; and
introducing the FLCM-suspension treatment fluid into the wellbore in the subterranean formation so as to contact the at least one pore opening.

9. The method of claim 8, wherein temperature and pressure conditions of the wellbore in the subterranean formation are taken into account to calculate the yield gravity function.

10. The method of claim 8, wherein temperature and pressure conditions of the wellbore are taken into account to calculate the equivalent circulating density.

11. The method of claim 8, wherein the properties used to calculate the yield gravity function is a concentration of the proposed FLCM particulates.

12. The method of claim 8, wherein the properties used to calculate the yield gravity function are an oil-to-water ratio of the proposed treatment fluid when the proposed treatment fluid is an oil-based fluid; a water-in-oil emulsion; or a oil-in-water emulsion.

13. The method of claim 8, wherein the equivalent circulating density is substantially equal to or greater than a pore pressure of the wellbore in the subterranean formation and substantially equal to or less than a fracture gradient of the wellbore in the subterranean formation.

14. The method of claim 8, wherein the steps of calculating the suspendability of the proposed FLCM particulates in the proposed treatment fluid as determined by the yield gravity function or the experimental FLCM function, calculating the equivalent circulating density of the proposed treatment fluid containing the proposed FLCM particulates at at least one location in the wellbore, and manipulating at least one of the properties of the proposed treatment fluid, the properties of the proposed FLCM particulates, or the proposed wellbore operation based on the yield gravity function or the experimental FLCM function and the equivalent circulating density are repeated at least once so as to produce the FLCM suspension carrier fluid.

15. A method comprising:
providing a wellbore in a subterranean formation having at least one pore opening;
providing a proposed wellbore operation;
providing a proposed treatment fluid;
providing proposed FLCM particulates;
calculating the suspendability of the proposed FLCM particulates in the proposed treatment fluid as determined by a yield gravity function based on properties of the proposed treatment fluid and properties of the proposed FLCM particulates or as determined by an experimental FLCM function,
wherein the properties of the proposed treatment fluid and the properties of the proposed FLCM particulates are selected from the group consisting of rheological properties of the proposed treatment fluid; density of the proposed treatment fluid; size distribution of the proposed FLCM particulates; density of the proposed FLCM particulates; and any combination thereof;
manipulating at least one of the properties of the proposed treatment fluid, the properties of the proposed FLCM particulates, or the proposed wellbore operation based on the yield gravity function or the experimental FLCM function so as to produce a FLCM-suspension treatment fluid; and
introducing the FLCM-suspension treatment fluid into the wellbore in the subterranean formation so as to contact the at least one pore opening.

16. The method of claim 15, wherein temperature and pressure conditions of the wellbore in the subterranean formation are taken into account to calculate the yield gravity function.

17. The method of claim 15, wherein the properties used to calculate the yield gravity function is a concentration of the proposed FLCM particulates.

18. The method of claim 15, wherein the properties used to calculate the yield gravity function are an oil-to-water ratio of the proposed treatment fluid when the proposed treatment fluid is an oil-based fluid; a water-in-oil emulsion; or a oil-in-water emulsion.

19. The method of claim 15, wherein the steps of calculating the suspendability of the proposed FLCM particulates in the proposed treatment fluid as determined by the yield gravity function or the experimental FLCM function and manipulating at least one of the properties of the proposed treatment fluid, the properties of the proposed FLCM particulates, or the wellbore operation based on the yield gravity function are repeated at least once so as to produce the FLCM-suspension carrier fluid.

20. The method of claim 15, wherein the proposed FLCM particulates are of a size distribution estimated to plug a fracture within the wellbore in the subterranean formation.

* * * * *